(12) United States Patent
Shao et al.

(10) Patent No.: US 8,532,034 B2
(45) Date of Patent: Sep. 10, 2013

(54) METHOD AND SYSTEM FOR COORDINATING WIRELESS COMMUNICATION OF DIFFERENT WAVEFORMS IN THE SAME FREQUENCY BAND

(75) Inventors: Huai-Rong Shao, Santa Clara, CA (US); Chiu Ngo, San Francisco, CA (US)

(73) Assignee: Samsung Electronics Co., Ltd, Suwon (KR)

(*) Notice: Subject to any disclaimer, the term of this patent is extended or adjusted under 35 U.S.C. 154(b) by 934 days.

(21) Appl. No.: 12/339,765

(22) Filed: Dec. 19, 2008

(65) Prior Publication Data

US 2009/0168713 A1 Jul. 2, 2009

Related U.S. Application Data

(60) Provisional application No. 61/016,779, filed on Dec. 26, 2007.

(51) Int. Cl.
*H04W 4/00* (2009.01)
*H04W 72/00* (2009.01)

(52) U.S. Cl.
USPC ........... 370/329; 370/328; 370/338; 370/341; 455/422.1; 455/450

(58) Field of Classification Search
USPC ........................................................ 370/329
See application file for complete search history.

(56) References Cited

U.S. PATENT DOCUMENTS

| | | | | |
|---|---|---|---|---|
| 6,980,810 B1 * | 12/2005 | Gerakoulis et al. | ........... | 455/450 |
| 7,634,275 B2 * | 12/2009 | Odman | ........... | 455/450 |
| 7,855,985 B2 * | 12/2010 | Kwon | ........... | 370/310 |
| 7,933,217 B2 * | 4/2011 | Shin et al. | ........... | 370/252 |
| 7,948,934 B2 * | 5/2011 | Espina et al. | ........... | 370/328 |
| 8,031,666 B2 * | 10/2011 | Jeon et al. | ........... | 370/329 |
| 8,059,624 B2 * | 11/2011 | Kwon | ........... | 370/340 |
| 8,179,871 B2 * | 5/2012 | Shao et al. | ........... | 370/338 |
| 8,259,647 B2 * | 9/2012 | Shao et al. | ........... | 370/328 |
| 8,325,686 B2 * | 12/2012 | Shao et al. | ........... | 370/337 |
| 8,396,018 B2 * | 3/2013 | Shao et al. | ........... | 370/312 |
| 2004/0114563 A1 * | 6/2004 | Shvodian | ........... | 370/347 |
| 2005/0025181 A1 * | 2/2005 | Nazari | ........... | 370/469 |
| 2005/0068934 A1 * | 3/2005 | Sakoda | ........... | 370/350 |

(Continued)

OTHER PUBLICATIONS 802.15 Working Group of the 802 Committee, "Merged-proposal-new-phy-layer-and-enhancement-mac-mmwave-system-proposal", IEEE 802.15.3c, 802.15-07-0934-01-003c, Nov. 2007, pp. 1-89, United States.

*Primary Examiner* — Ian N Moore
*Assistant Examiner* — Jenee Alexander
(74) *Attorney, Agent, or Firm* — Kenneth L. Sherman, Esq.; Michael Zarrabian, Esq.; Sherman & Zarrabian LLP

(57) ABSTRACT

A method and system for coordinating wireless communication of different waveforms in the same frequency band, is provided, the network including multiple wireless stations of different types operating at the same wireless frequency band but at different waveform formats. Channel bandwidth is allocated by scanning all available channels in the frequency band to detect available channels. When the number of detected available channels is not less than the number of wireless station types, then scheduling and transmitting beacon periods for the different types of wireless stations to different available channels, wherein each type of wireless station may have a dedicated available channel period for wireless communication in parallel with other types of wireless stations.

31 Claims, 14 Drawing Sheets

(56) References Cited

U.S. PATENT DOCUMENTS

| | | | |
|---|---|---|---|
| 2005/0185669 A1* | 8/2005 | Welborn et al. | 370/442 |
| 2005/0249173 A1* | 11/2005 | Salokannel et al. | 370/338 |
| 2006/0077930 A1* | 4/2006 | Kim et al. | 370/329 |
| 2007/0064644 A1* | 3/2007 | Dowling et al. | 370/328 |
| 2007/0230423 A1* | 10/2007 | Yoshida et al. | 370/338 |
| 2008/0273494 A1* | 11/2008 | Vook et al. | 370/330 |

* cited by examiner

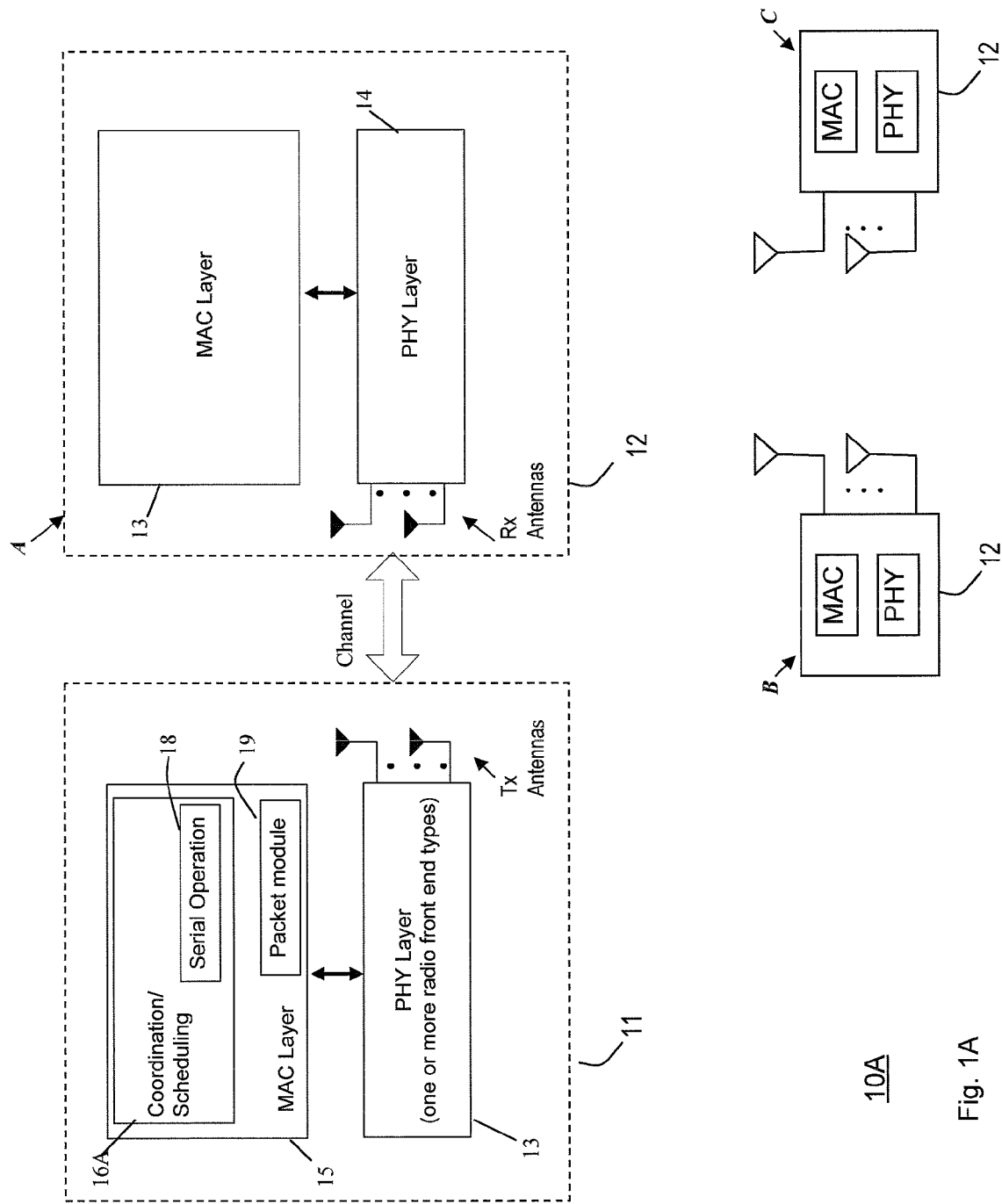

METHOD AND SYSTEM FOR COORDINATING WIRELESS COMMUNICATION OF DIFFERENT WAVEFORMS IN THE SAME FREQUENCY BAND

RELATED APPLICATION

This application claims priority from U.S. Provisional Patent Application Ser. No. 61/016,779, filed on Dec. 26, 2007, incorporated herein by reference.

FIELD OF THE INVENTION

The present invention relates to wireless communication, and in particular, to wireless communication of different waveforms in the same frequency band.

BACKGROUND OF THE INVENTION

Wireless networks generally include multiple wireless stations communicating over a wireless medium such as via radio frequency (RF) signals. Operating at the same wireless frequency band, different wireless stations may have different waveform formats. If these wireless stations cannot detect and understand the waveform formats from each other, then interference problems may occur when the wireless stations operate in close proximity.

BRIEF SUMMARY OF THE INVENTION

The present invention provides a method and system for coordinating wireless communication of different waveforms in the same frequency band. One embodiment includes a method of providing coordination for managing communication of information over one or more wireless channels in a network including multiple wireless stations of different types operating at the same wireless frequency band but at different waveform formats. The method includes allocating channel bandwidth by dividing channel time into one or more superframes, each superframe started from a beacon providing schedules for communication of packets of information over one or more channels. Allocating channel bandwidth further includes scanning all available channels in the frequency band to detected available channels, wherein when the number of detected available channels is same or greater than the number of wireless station types, then scheduling and transmitting beacon periods for the different types of wireless stations to different available channels, wherein each type of wireless station may have a dedicated available channel period for wireless communication in parallel with other types of wireless stations, without interference with said other types of wireless stations.

The method may further include, when the number of detected available channels is smaller than the station types, then for a detected channel, scheduling and transmitting beacon periods for different types of wireless stations for the detected channel, wherein multiple different beacon types may be scheduled anywhere in each superframe such that one or more reserved channel time blocks for each station type may be scheduled in each superframe for serial wireless communication on the detected channel by different station types.

The method may further include, for serial communication, scheduling beacon periods for different types of wireless stations in the same channel further includes scheduling one or more unreserved channel time blocks or contention access periods in each superframe. Superframes bounded by beacons may be of different lengths for different station types. The method may further include, a wireless station of one of said types scanning all channels to detect the beacons for that wireless station type, and upon detecting a beacon of the type for that wireless station on a channel, the wireless station conducting an association process on that channel based on the detected beacon information.

In another embodiment, the present invention provides coordination for managing communication of information over one or more wireless channels in a network including multiple wireless stations of different types operating at the same wireless frequency band but at different waveform formats. The method includes allocating channel bandwidth by dividing channel time into one or more superframes, each superframe bounded by a pair of beacons providing schedules for communication of packets of information over one or more channels. Allocating channel bandwidth further includes scanning all available channels in the frequency band to detect available channels, selecting a channel among the detected channels, then scheduling and transmitting beacon periods for different types of wireless stations for the selected channel, wherein multiple different beacon types may be scheduled anywhere in each superframe such that one or more reserved channel time blocks for each station type may be scheduled in each superframe for serial wireless communication on the selected channel by different station types.

The method may further include, when there is insufficient channel time in the selected channel for all the different station types, then allocating channel bandwidth further includes scheduling and transmitting one or more types of beacons to other channels such that different types of stations may operate on different channels based on time division scheduling. For serial communication, scheduling beacon periods for different types of wireless stations in the same channel may further include scheduling one or more unreserved channel time blocks or contention access periods in each superframe.

These and other features, aspects and advantages of the present invention will become understood with reference to the following description, appended claims and accompanying figures.

BRIEF DESCRIPTION OF THE DRAWINGS

FIGS. 1A-B show functional block diagrams of wireless communication systems, each including a coordinator implementing a process for coordinating wireless communication of different waveforms in the same frequency band using a superframe structure, according to an embodiment of the present invention.

DETAILED DESCRIPTION OF THE INVENTION

Figure 1B:
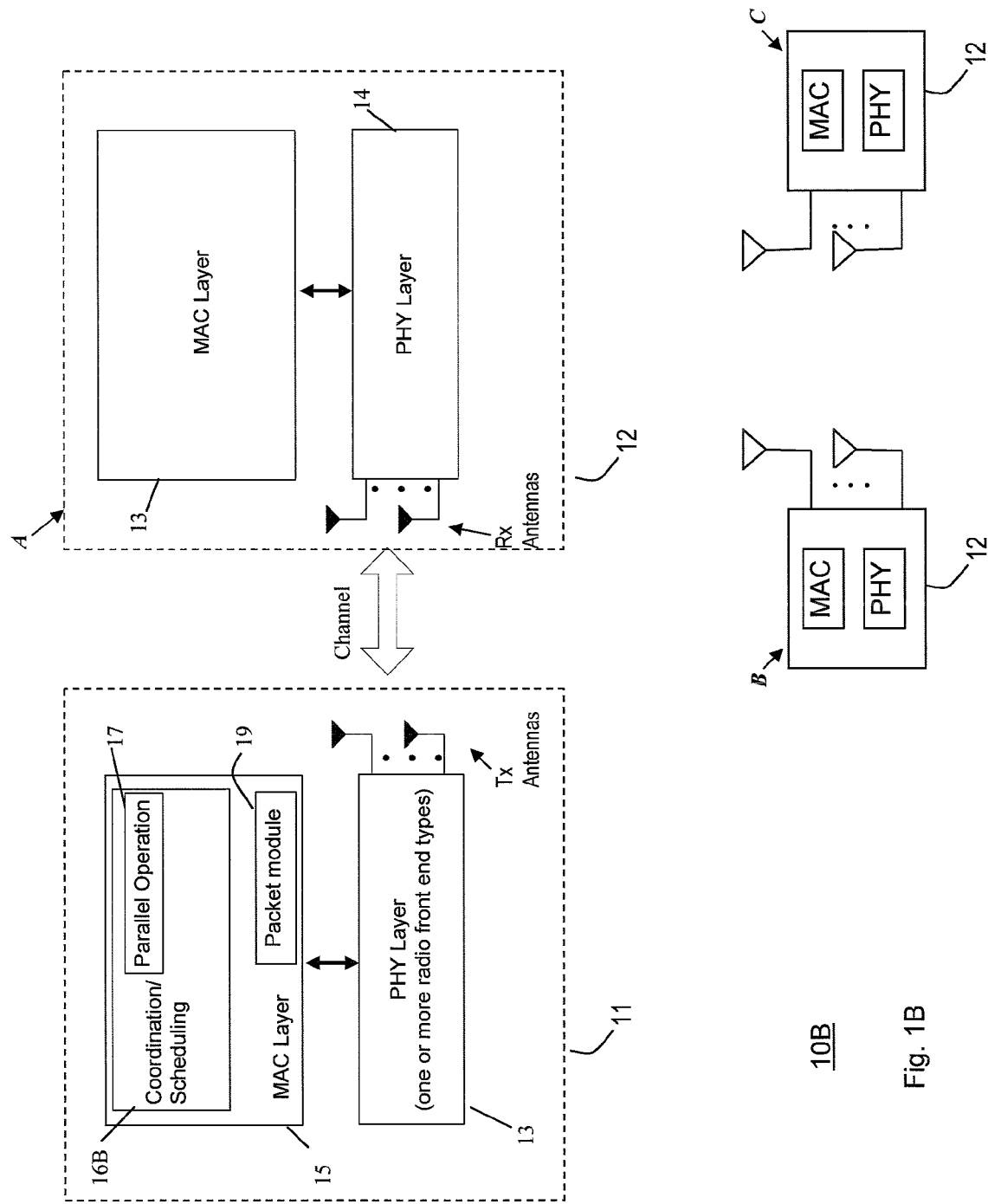

The present invention provides a method and system for coexistence and channel sharing support among multiple wireless stations. One embodiment involves using universal coordination among different wireless stations which operate at the same wireless frequency band but at different waveform formats, to provide coexistence and channel sharing support among such wireless stations for communication therebetween.

Many wireless standardization bodies such as WirelessHD consortium, IEEE 802.15.3c task group, NGmS and ECMA TC48, provide different wireless personal area network (WPAN) standards on the same 60 GHz frequency band. Embodiments of the present invention allow coexistence and interoperability among wireless stations using different standards based on different waveform types of beacons.

In many wireless communication systems, a frame structure is used for data transmission between wireless stations such as a transmitter and a receiver. For example, the IEEE 802.15 standard uses frame format in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a frame from a transmitter to a receiver, a preamble is attached to the PPDU, wherein the preamble can include channel estimation and synchronization information.

There are two approaches for a wireless station (STA) to access a shared wireless communication channel. One approach is a contention free arbitration (CF) method, and the other is a contention based arbitration (CB) method. The CF access method utilizes reservation through the coordinator in advance to coordinate the access to the channel. The wireless channel may be a random access channel during the CB. Any of a number of random access schemes may be used in the network, including, but not limited to, slotted Aloha, carrier sense multiple access (CSMA), carrier sense multiple access with collision avoidance (CSMA/CA), or preamble sense multiple access (PSMA). As is the case in many random access schemes, collisions may occur when a number of devices transmit data packets simultaneously.

Further, a broadcasting scheme based on a superframe structure may be used, wherein beacons divide the channel time into multiple superframes. In each superframe there are contention periods and contention free periods. In each contention free period (CFP) there are one or more schedules. Each schedule includes one or more channel time blocks (CTBs) which may be reserved for transmission of data. Time periods between the schedules may be unreserved CTBs.

A superframe may include a contention-based control period (CBCP) and a CFP, wherein a CFP may include multiple reserved CTBs and/or unreserved CTBs. Specifically, the superframe may include a beacon frame ("beacon") which is used to set timing allocations and to communicate management information for the network. It is assumed that beacon signals are always transmitted omni-directionally. The superframe may also include a contention-based control period (CBCP) which may be used to communicate control and management commands. There can also be a beam-search period (BSP) between a CBCP and the CFP, or within the CFP, to search transmission beams and adjust beamforming parameters for directional transmissions.

A beacon is transmitted by the coordinator to identify the start of every superframe. Configuration of the superframe and other parameters are included in the beacon. For example, the beacon indicates the start time and length of the CBCP period(s) and the CFP period(s). In addition, the beacon dictates allocation of the CTBs in the CFP to different wireless stations since the stations can implicitly determine the timing information of the unreserved CTBs, a beacon frame need not carry timing information for unreserved CTBs.

According to an embodiment of the invention using universal coordination among different wireless stations which operate at the same wireless frequency band but at different waveform formats, to provide coexistence and channel sharing support among such wireless stations, involves utilizing beacon location scheduling and channel assignment. A beacon for one waveform format can be anywhere in the superframe of another waveform format. In addition, both serial operation and parallel operation may be used in coordination of channel assignment and channel time allocation. This supports coexistence and channel bandwidth sharing of different types of wireless station which operate at the same frequency band but cannot directly communicate with each other due to different waveform formats. No common mode waveform is required.

An embodiment of the invention including a universal coordinator design, is now described. FIG. 1A shows a functional block diagram of a wireless network 10A including a universal coordinator (UC) 11 and multiple wireless stations 12 of different types (e.g., types A, B, C) which operate at the same wireless frequency band but at different waveform formats. Each of the wireless stations 12 includes a MAC layer 13 and a PHY layer 14. Each PHY layer 14 may comprise one or multiple antennas. Different waveforms may share the same set of radio and baseband components or have separate sets of radio and baseband components. The MAC layers 13 enable discovery and association operations for selecting wireless channels for communication.

The UC 11 includes a MAC layer 15 and a PHY layer 13. The MAC layer 15 of the UC 11 includes a coordination module 16A and a packet module 19. The packet module 19 performs data packet operations. The coordination module implements channel time reservation to allocate bandwidth at selected data channels for data communication between wireless stations.

The coordination module 16A includes a Serial-Option (S-Option) operation function module 18, described further below. FIG. 1B shows another system 10B according to an embodiment of the invention wherein a coordination module 16B includes a Parallel-Option (P-Option) operation function module 17, described further below.

If different waveforms share the same set of radio and baseband components, the S-Option is used. If the UC has separate sets of radio and baseband components for different waveforms, the P-Option is used though S-option can also be used.

In one embodiment, a specialized superframe structure and channel time allocation scheme with universal coordination are used by the UC 11 to support coexistence and interoperability among 60 GHz wireless stations with different types of waveforms. Beacons for one waveform format can be placed anywhere in the superframe of another waveform format. Conventionally, all beacons are placed together in a beacon period of a superframe. According to this embodiment of the invention, beacons and beacon periods may be located anywhere in the superframe, which allows for variable length beacon periods.

Figure 2:
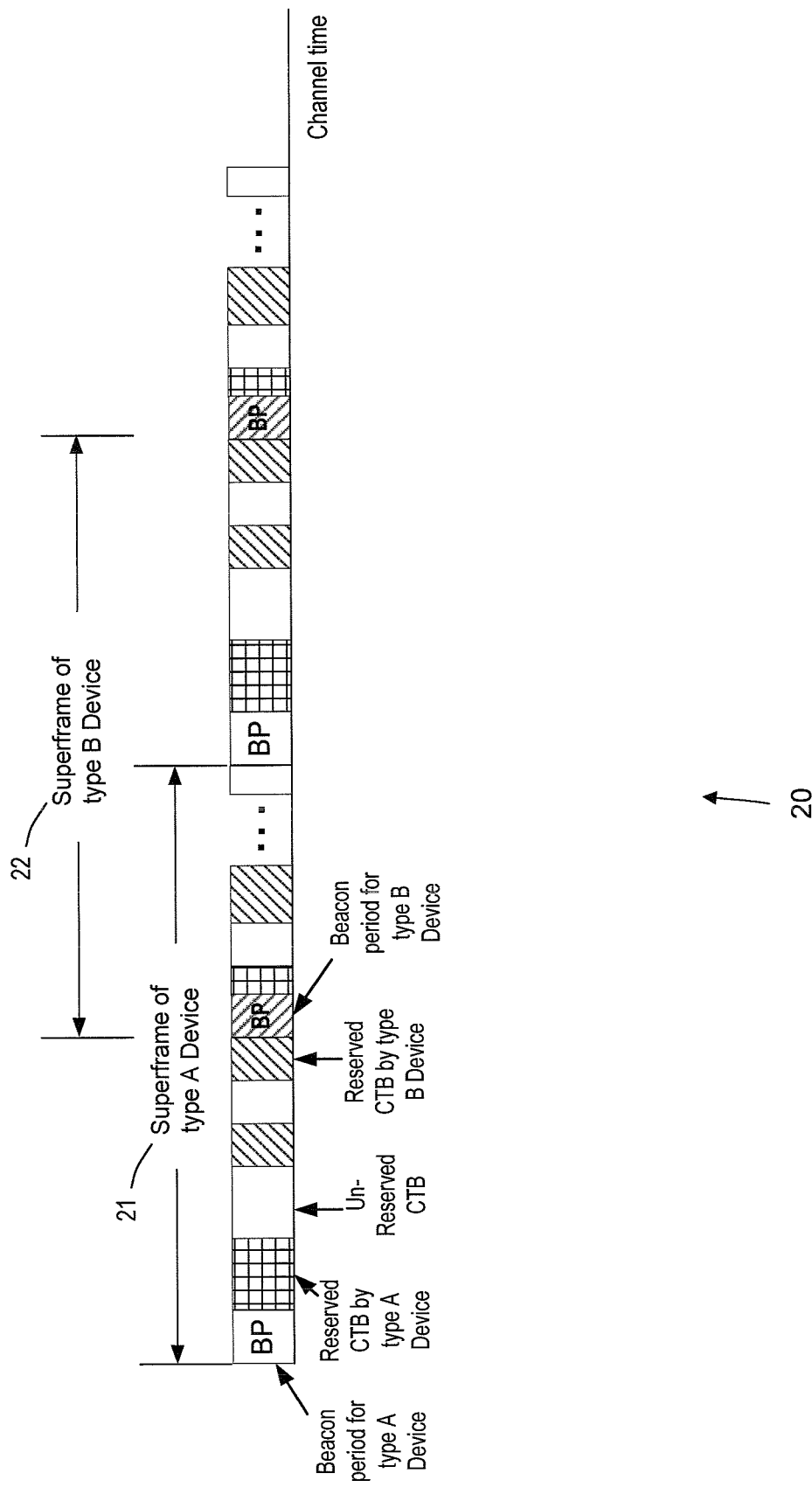
FIG. 2 shows a channel time allocation process for coordinating serial communication of different waveforms in the same frequency band by different wireless station types using a superframe structure, according to an embodiment of the present invention.

FIG. 2 shows an example of specialized superframe structures 20 supporting wireless communication for different types of wireless stations (which operate at the same wireless frequency band but at different waveform formats). In FIG. 2, a first superframe 21 is for a type A wireless stations (type A device), and a second superframe 22 is for a type B wireless stations (type B device). The superframes allow for beacon periods for type A and type B devices that have variable beacon period lengths from one superframe to another, to coexist. Conventionally a superframe always has the one beacon period followed by one contention period and then a contention free period. However, according to an embodiment of the invention, each specialized superframe structure has the following new characteristics:

One or multiple beacons or beacon periods can be in each superframe.
One or multiple reserved Channel Time Blocks (CTBs) or Channel Time Allocation Periods (CTAPs) can be in each superframe.
One or multiple Unreserved CTBs or Contention Access Period (CAPs) can be in each superframe.
The length of a superframe bounded by beacons can be different for different types of devices (i.e., some types of beacons may not be placed in each superframe of other devices).

Operations based on the specialized superframe structures can be parallel or serial. In parallel operation, a universal coordinator attempts to assign different channels to different waveform formats first before inviting devices with different waveforms to share the same communication channel. In serial operation, the universal coordinator attempts to share the same channel among devices with different waveforms before performing channel switching. There is no need for a common mode waveform. In addition, the invention provides a more general and flexible solution for beacon or beacon period scheduling. An embodiment of the invention described hereinbelow allows coexistence and interoperability between wireless devices from different standards, such as coexistence and interoperability issue between devices from different radio frequency 60 GHz standards (e.g., WirelessHD consortium, IEEE 802.15.3c task group, NGmS and ECMA TC48).

With different types of waveforms at 60 GHz, one wireless device may need to transmit multiple types of beacons regularly on the same channel. For example, a wireless coordinator specified by IEEE 802.15.3c may transmit one single carrier (SC) beacon and two different Orthogonal frequency-division multiplexing (OFDM) beacons at each superframe. Moreover, many wireless standardization bodies (e.g., WirelessHD consortium, IEEE 802.15.3c task group, NGmS and ECMA TC48) provide different wireless personal area network (WPAN) standards on the same 60 GHz frequency band.

Figure 3:
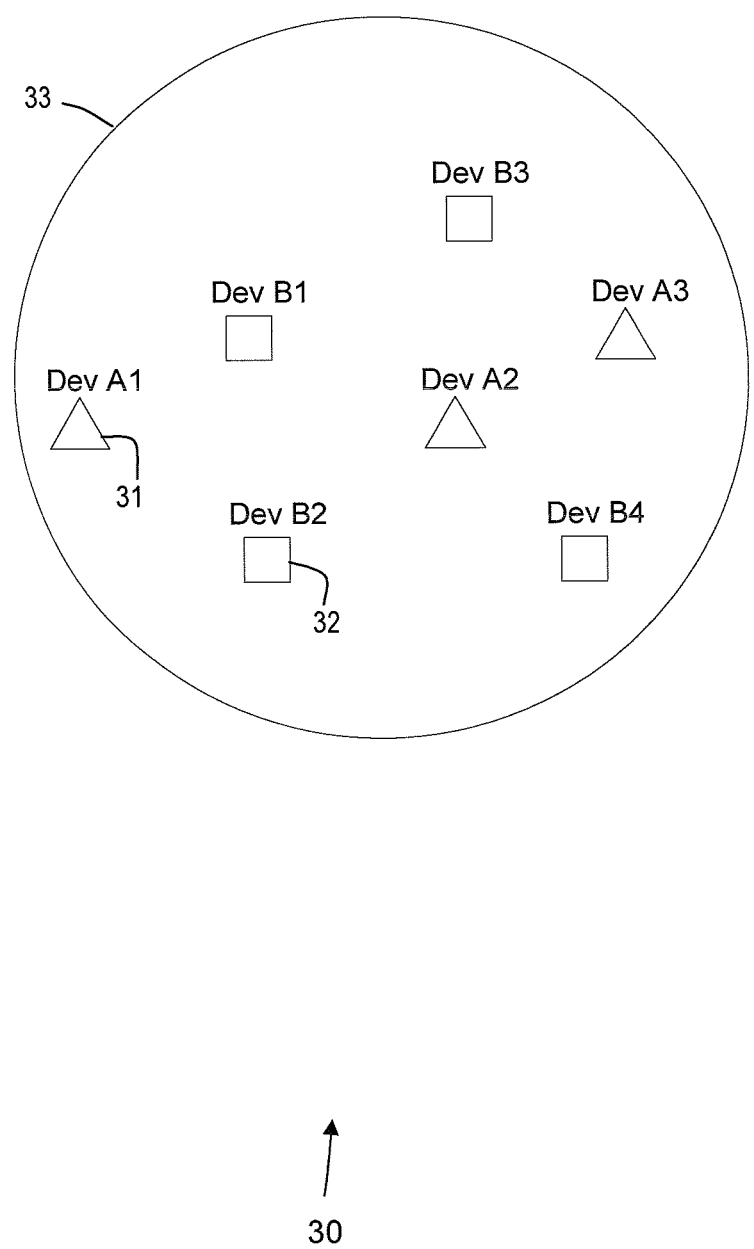
FIG. 3 shows a wireless network including multiple wireless stations of different types.

FIG. 3 shows a wireless network 30 including wireless devices implementing different wireless standards on the same frequency band, DEV Ai type 31 and DEV Bj type 32 (e.g., first type wireless devices Dev A1, Dev A2, Dev A3, and second type wireless devices: Dev B1, Dev B2, Dev B3, Dev B4). As shown in FIG. 3, the two types of wireless devices DEV Ai and DEV Bj coexist in the same geographic location 33 and operating at the same wireless frequency band. DEV Ai and DEV Bj may use different baseband (BB)/antenna approaches and have different waveform formats. Therefore, DEV Ai and DEV Bj cannot communicate with each other directly and their communications may interfere with each other.

Figure 4:
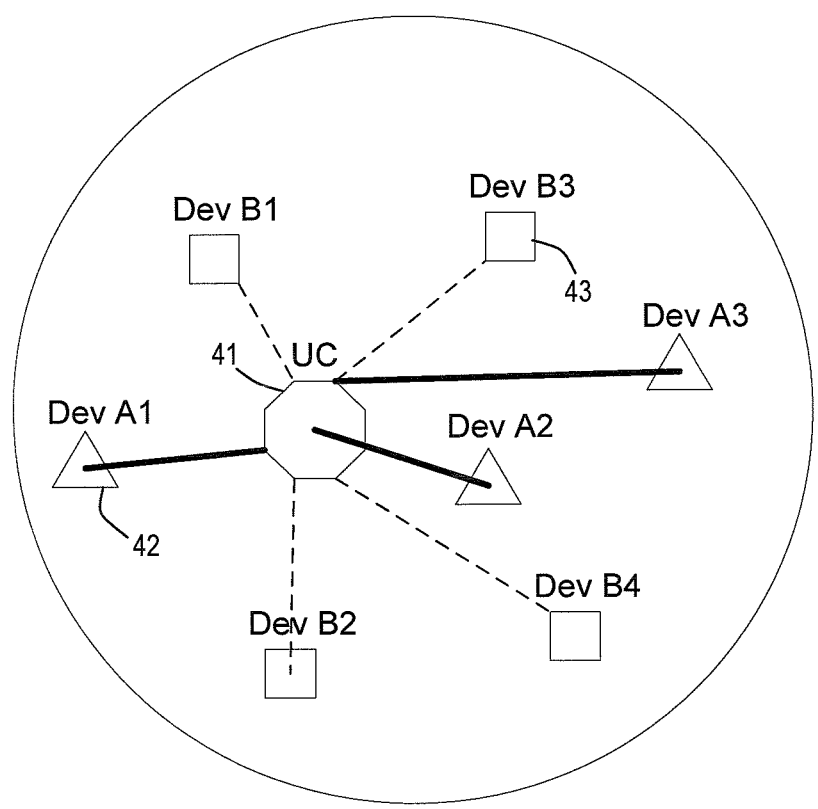
FIG. 4 shows a wireless network including a universal coordinator and multiple of wireless stations of different types, wherein the universal coordinator coordinates wireless communication of different waveforms in the same frequency band by different wireless station types using a superframe structure, according to an embodiment of the present invention.

The universal coordinator does not require the various wireless device types to support a common mode waveform for communication. The UC supports different types of waveform formats and is in charge of coexistence coordination among different types of wireless devices. FIG. 4 shows a wireless network 40 including a UC 41 (an implementation of the UC 11 in FIGS. 1A-B), and wireless devices implementing different wireless standards on the same frequency band, DEV Ai type 42 and DEV Bj type 43 (e.g., first type wireless devices Dev A1, Dev A2, Dev A3, and second type wireless devices: Dev B1, Dev B2, Dev B3, Dev B4). The UC 41 uses different waveforms to communicate with different types of devices and coordinate communication channel resource sharing.

The UC 41 may implement two different functions in supporting devices implementing different types of communication waveforms. One UC function involves said Serial-Option (S-Option) operation module 18 (FIG. 1A), wherein the UC 41 uses a common baseband and antenna component to support waveforms of different types of wireless devices (i.e., wireless devices which operate at the same wireless frequency band but at different waveform formats). In this option, the UC 41 cannot communicate with different types of wireless devices in parallel. Instead, the UC 41 communicates with different types of wireless devices using a time division approach.

Another UC function involves said Parallel-Option (P-Option) operation module 17 (FIG. 1B), wherein the UC 41 uses a separate baseband or antenna component to support communication with different types of wireless devices (i.e., wireless devices which operate at the same wireless frequency band but at different waveform formats). The UC 41 can communicate with different types of wireless devices in parallel (simultaneously).

The UC 41 may comprise a wireless station with a MAC layer that implements said UC functions and coordination of communication channel allocation by the UC 41 for wireless devices operating at different waveforms in the 60 GHz frequency band, is described below according to an embodiment of the invention. At a target frequency band there are multiple channels. For example, in the 60 GHz frequency band there may be multiple channels such that if each channel has a 2 GHz in bandwidth, then in one scenario three 60 GHz channels may be utilized. The UC allocates these channels to different types of wireless devices, including allocating channel time at one channel to different types of wireless devices. Hereinafter, such wireless devices comprise wireless devices which operate at the same wireless frequency band but at different waveform formats.

Figure 5:
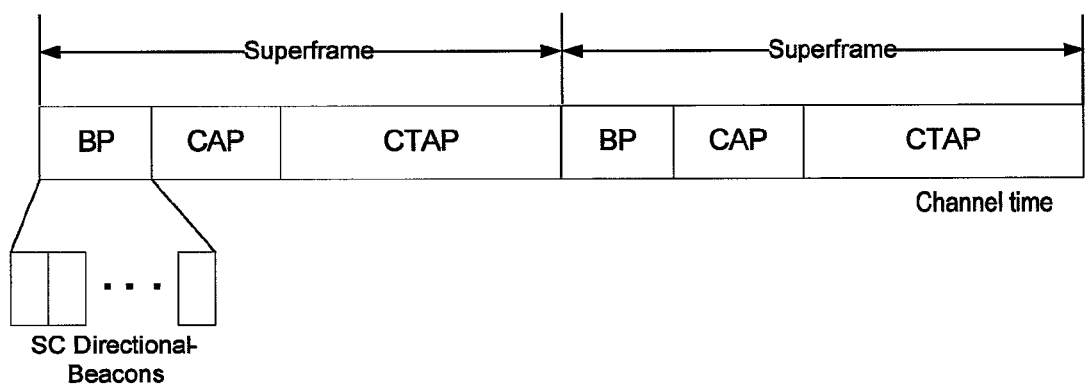
FIG. 5 shows a channel time allocation scheme, according to an embodiment of the invention.
Figure 6:
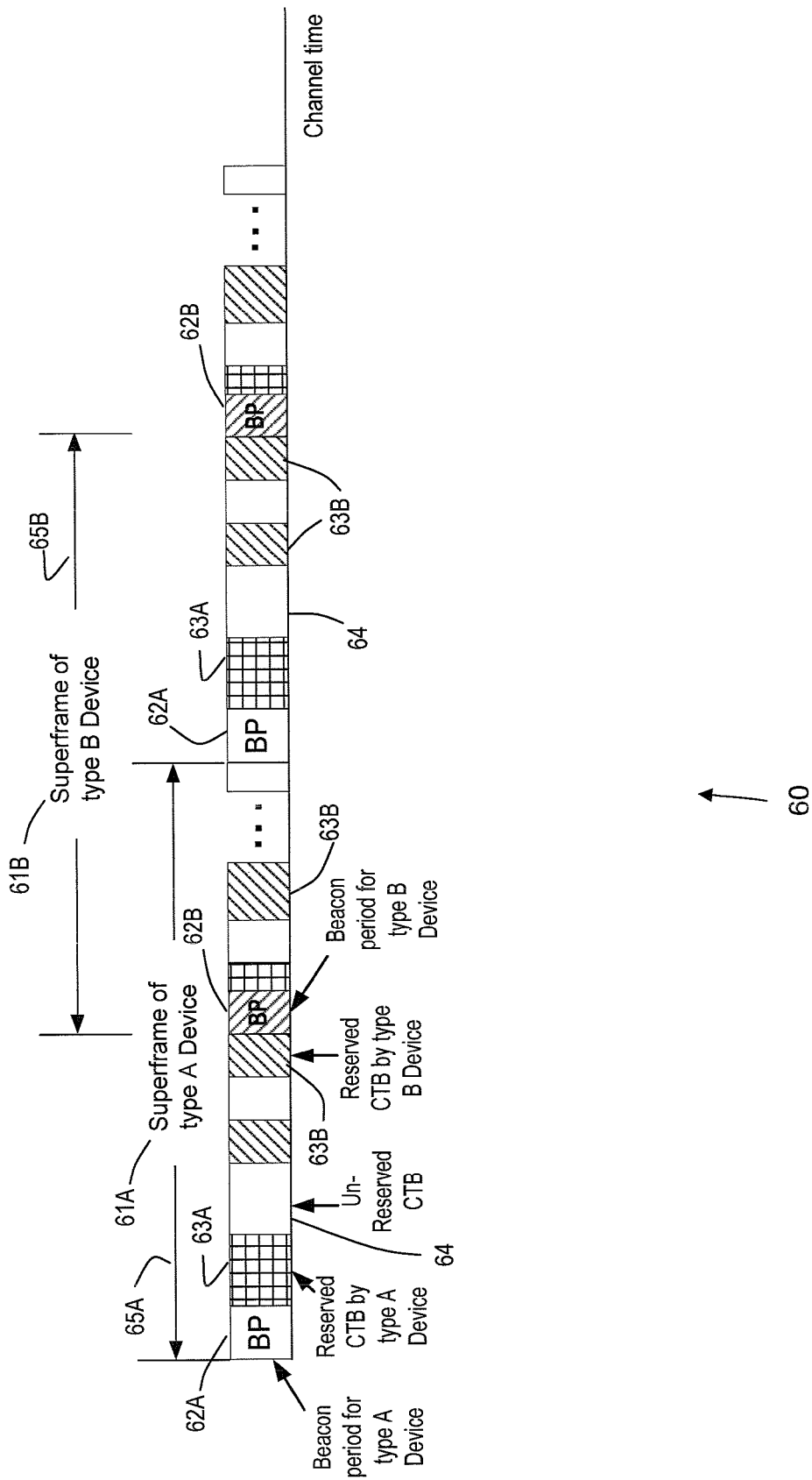
FIG. 6 shows a channel time allocation process for coordinating serial communication of different waveforms in the same frequency band by different wireless station types using a superframe structure, according to an embodiment of the present invention.

The UC uses a superframe structure at each channel to divide the channel time. Unlike conventional superframe approaches (FIG. 5) with a fixed superframe structure 50 (i.e., beacon or beacon period, Contention Access Period (CAP) and Channel Time Allocation Period (CTAP), according to an embodiment of the invention, a channel time allocation 60 in FIG. 6 shows superframe structure 61A, 61B for each channel providing:

One or multiple beacons or beacon periods (BP) 62A, 62B that may be in each superframe.
One or multiple reserved CTBs or CTAs (i.e., 63A, 63B) which may be in each superframe.
One or multiple unreserved CTBs or CAPs (i.e., 64) which may be in each superframe.
Superframe length (durations 65A, 65B), bounded by beacons, that may be different for different types of wireless devices (some types of beacons may not be placed in each superframe of other devices).
Superframes for different types of devices may overlap based on beacon placement. Beacons for different device types can be anywhere in each superframe. As such, one or more reserved CTBs for different device types may be in each superframe. Also one or more unreserved CTBs or contention access periods (CAPs) may be in each superframe. Superframes bounded by beacons can be of a different structure (e.g., length) for different device types.

Allowing beacon or beacon periods anywhere in each superframe allows for variable length beacon periods. For example, in FIG. 6, both beacon periods for type A and type B devices (i.e., beacon periods 62A and 62B, respectively) may have variable beacon period lengths from one superframe to another.

Different waveforms have their own superframe structures. Each superframe for one type waveform is started from one beacon of its own waveform type, or one beacon period which includes multiple copies of the same beacon transmitted at different directions.

Example operations of the UC, using the specialized superframe structure of the invention is described below.

UC Operation Based on UC P-Option (Parallel Operation)

Figure 7:
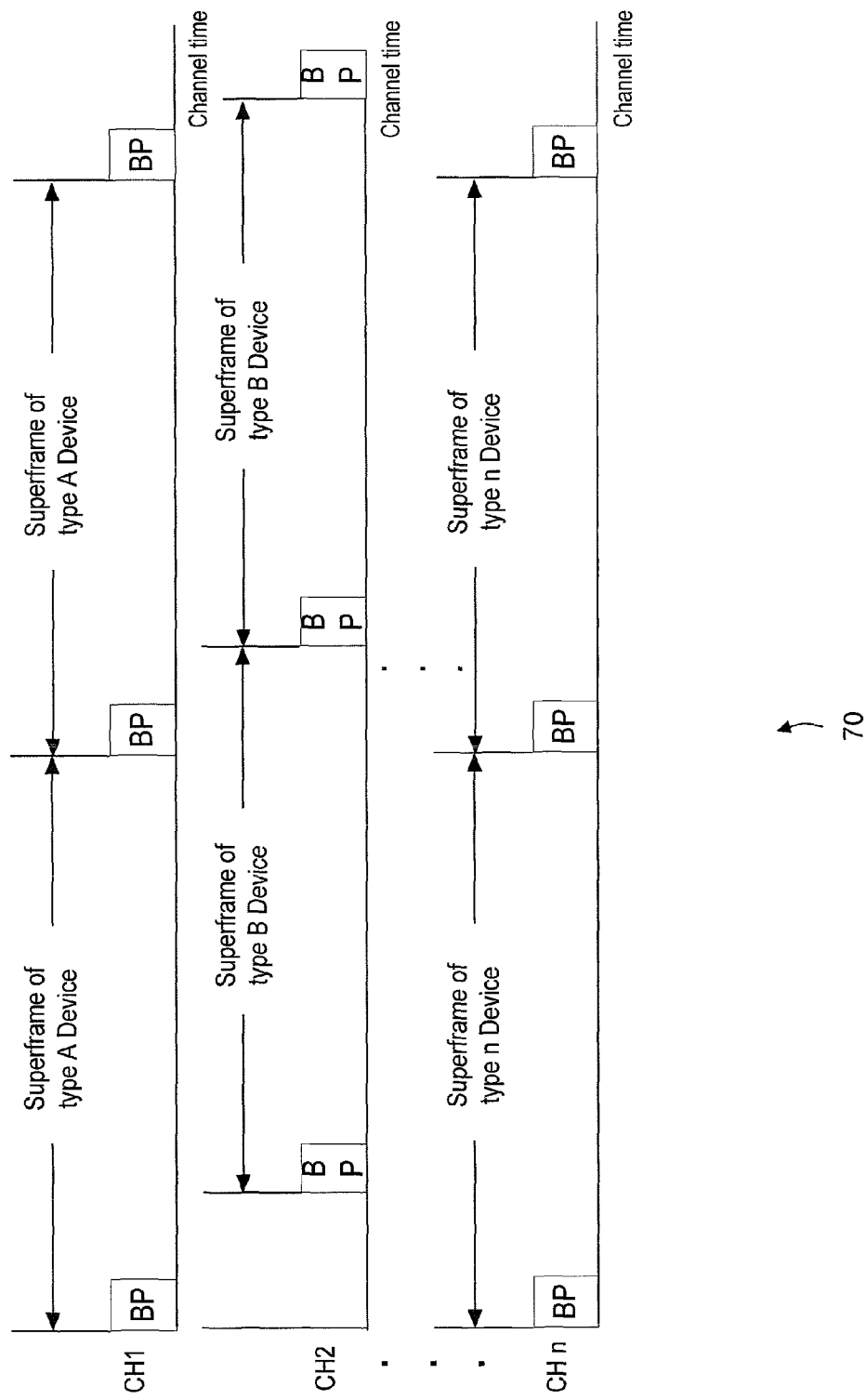
FIG. 7 shows a channel time allocation process for coordinating parallel communication of different waveforms in the same frequency band by different wireless station types using a superframe structure, according to an embodiment of the present invention.

In this case, the UC wireless station may include one or more PHY layers (or front end radio types) and communication modules/antennas for wireless communication using different waveforms in the same frequency band, at the same time (i.e., in parallel). Referring to the example superframe structures for channel time allocations 60 and 70 in FIGS. 6 and 7, respectively, when the UC turns on:

1) The UC scans all available channels (i.e., CH1, CH2, ..., CHn, in a target frequency band) to find available channels including clean channels (i.e., channel with minimal RF energy detected) and/or channels with most available free/unreserved channel time.
2) If the number of available channels is same or greater than the number of wireless device types, the UC allocates (i.e., schedules) the different types of beacons or beacon periods according to device type to different channels, as shown by example in FIG. 7 where different types of beacon periods may overlap. Therefore, each type of wireless device can have a dedicated available channel period to operate on (i.e., perform wireless communication) without interference with other types of wireless devices.
3) If the number of clean channels is smaller than the device types then different devices types may need to share the same channel. Therefore, the UC allocates two or more types of beacons in the same channel as shown by example in FIG. 6, wherein superframes for different types of devices at least partially overlap based on beacon placement. Beacons for different device types can be anywhere in each superframe. One or more reserved CTBs for different device types may be in each superframe for wireless communication on the same channel. Also one or more unreserved CTBs or contention access periods (CAPs) may be in each superframe. Superframes bounded by beacons can be of a different structure (e.g., length) for different device types.

When a wireless device of a certain type turns on:

1) The MAC layer 13 (FIGS. 1A-B) of the wireless device is configured such that the wireless device scans all channels to find the beacons for that wireless device type (e.g., BP for type A device or BP for type C device, etc.).
2) Once the wireless device finds a beacon of the type for that wireless device on a channel, the MAC layer of the wireless device conducts an association process on that channel based on the superframe schedule information in the detected beacon. During an association process, the wireless devices involved exchange capability information on the channel for establishing a communication data channel.

UC Operation Based on UC S-Option (Serial Operation)

In this case, the UC wireless station may have one PHY layer and communication modules/antennas for wireless communication, wherein different waveforms in the same frequency band use the same PHY layer for communication of different waveforms one at a time (i.e., in serial).

Figure 8:
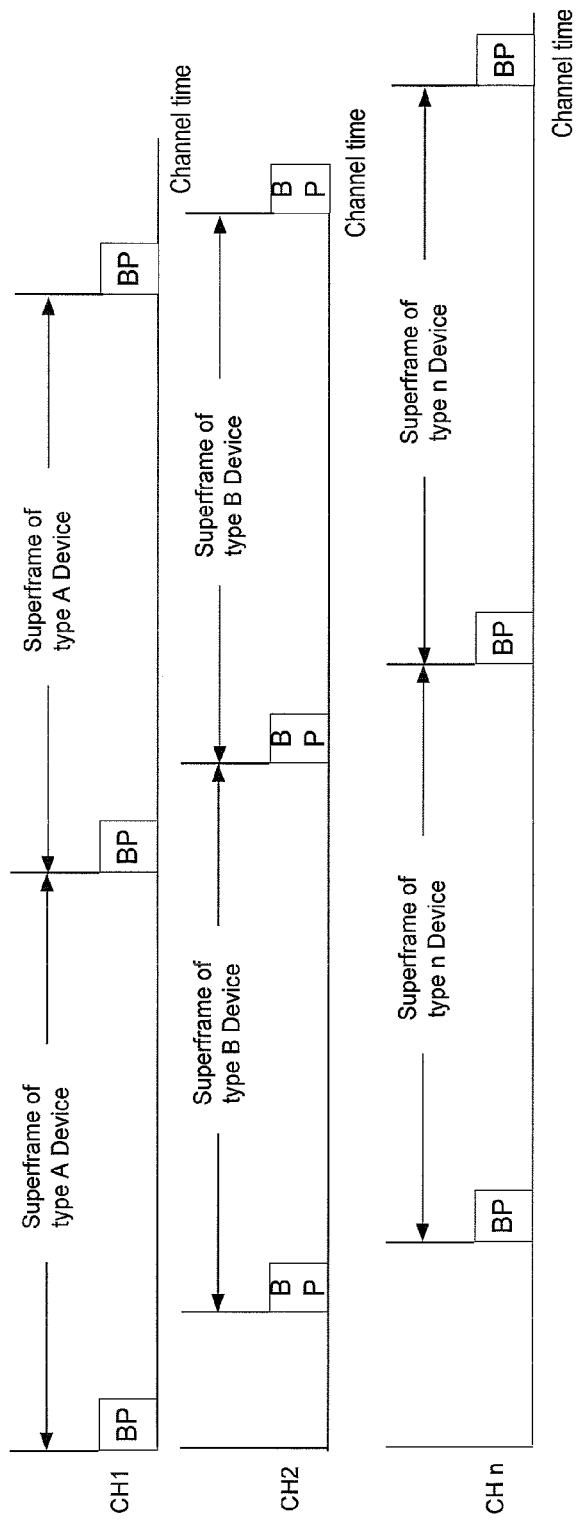
FIG. 8 shows a channel time allocation process for coordinating serial communication of different waveforms in the same frequency band by different wireless station types using a superframe structure, according to an embodiment of the present invention.

When the UC turns on:

1) The UC scans all available channels to find available channels including clean channels and/or channels with most available free channel time (if a channel is already occupied by other transmissions that channel is not considered)
2) The UC then selects the most available channel (e.g., cleanest channel or most available channel if a clean channel is unavailable), and allocates (schedules) beacons for different wireless device types on the selected channel, as shown by example in FIG. 6. In this way the UC may minimize large channel switching overhead (i.e., reduce time and power consumption caused by channel switching since the same channel is used for communication by different waveforms in serial).
3) If there is insufficient channel time for the different devices types, then the UC allocates certain types of beacons to other channels. In that case, time division is applied among different channels as shown by example superframe structures 80 for channel time allocations in FIG. 8 so that different types of devices may operate on different channels based on time division scheduling (no beacon periods may overlap, no reserved Channel Time Blocks (CTBs) may overlap either).

When a wireless device of a certain type turns on:

1) The MAC layer of the wireless device is configured such that the wireless device scans all channels to find beacons for that wireless device type.

2) Once the wireless device finds a beacon of the type for that wireless device on a channel, the MAC layer of the wireless device conducts an association process on that channel based on the superframe schedule information in the detected beacon. During an association process, the wireless devices involved exchange capability information on the channel for establishing a communication data channel.

Figure 9:
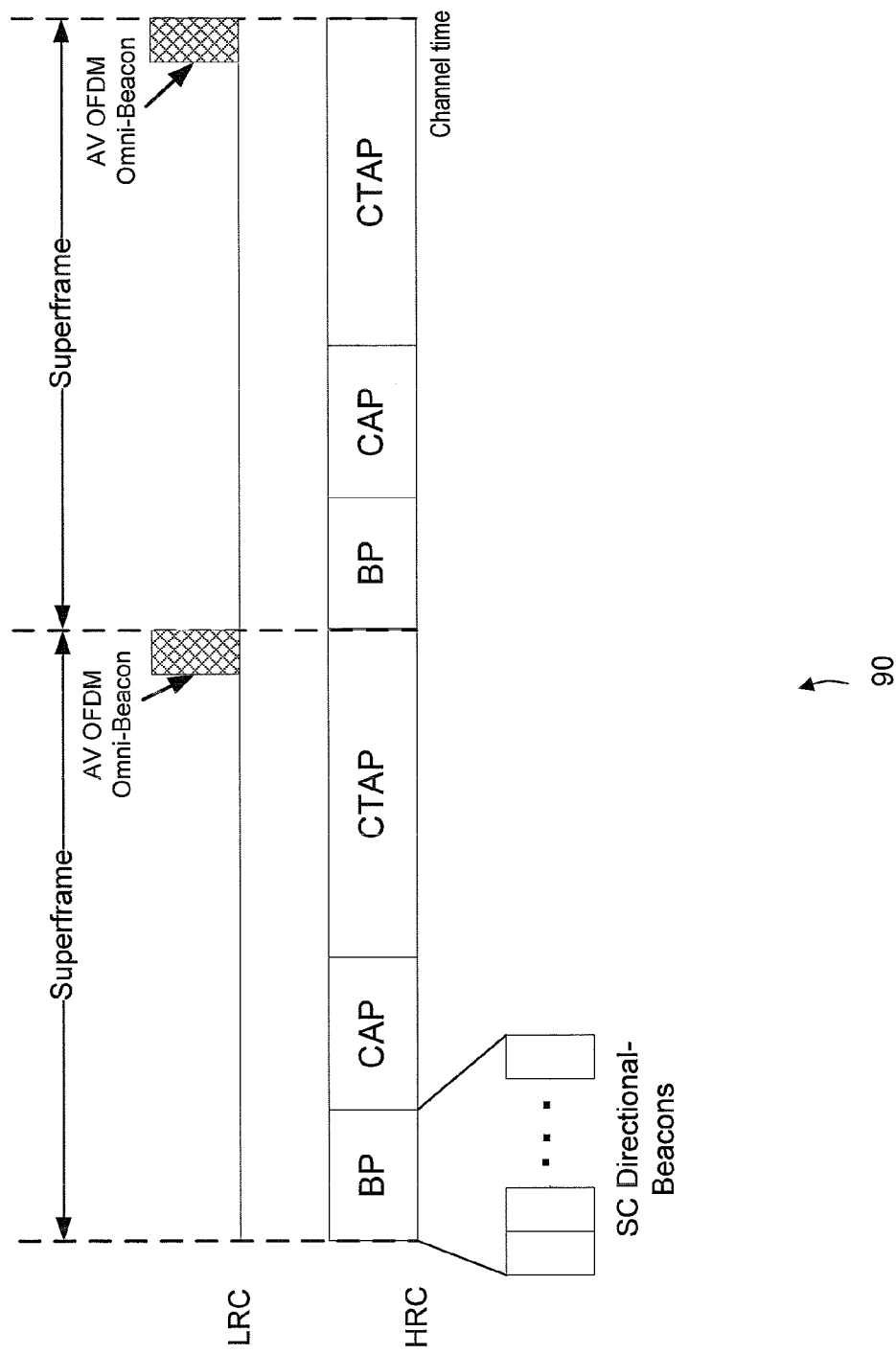
FIGS. 9-11 diagrammatically show an example implementation of a process for coordinating communication of different waveforms in the same frequency band by different wireless station types using a superframe structure, according to an embodiment of the present invention.
Figure 10:
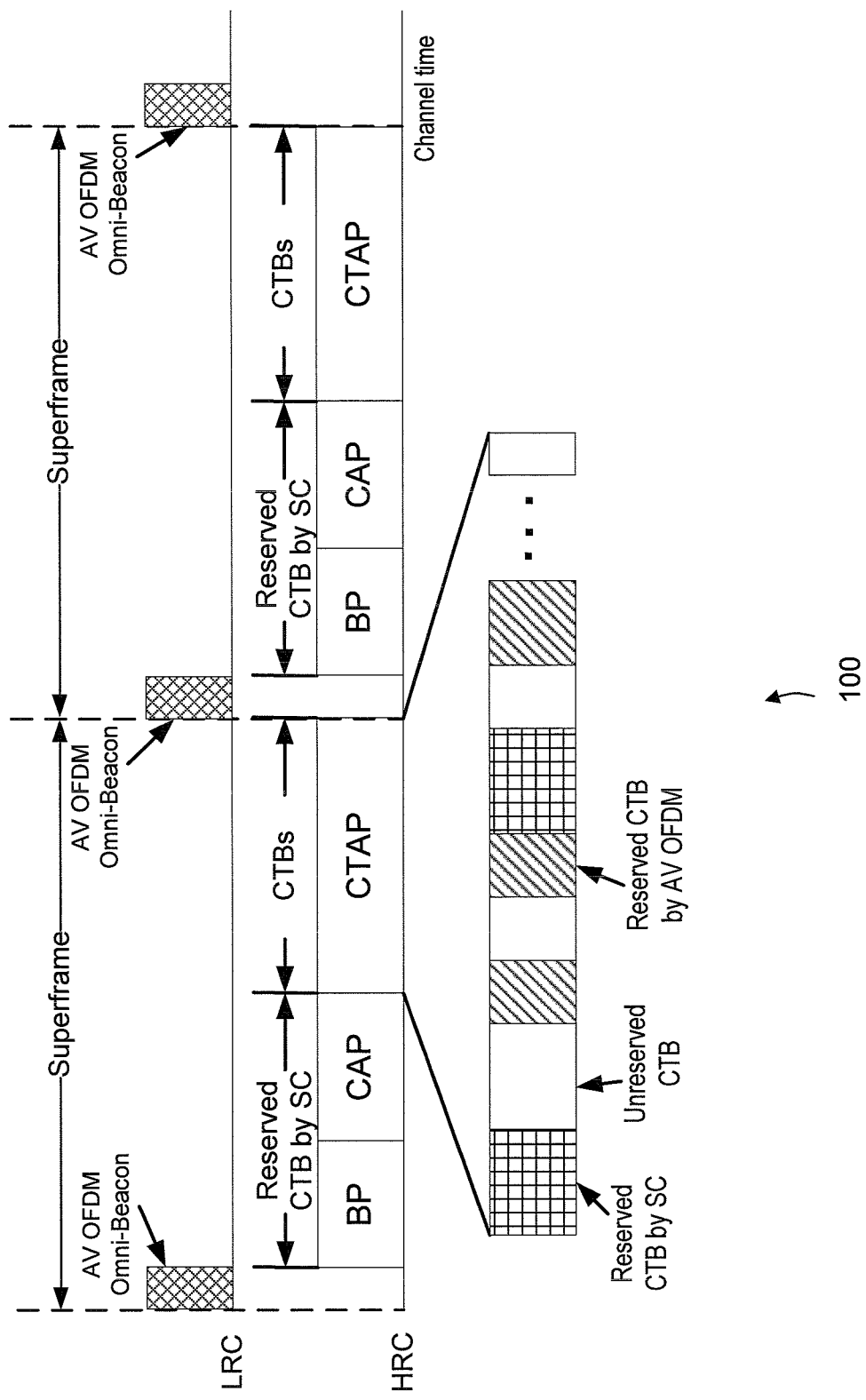
Figure 11:
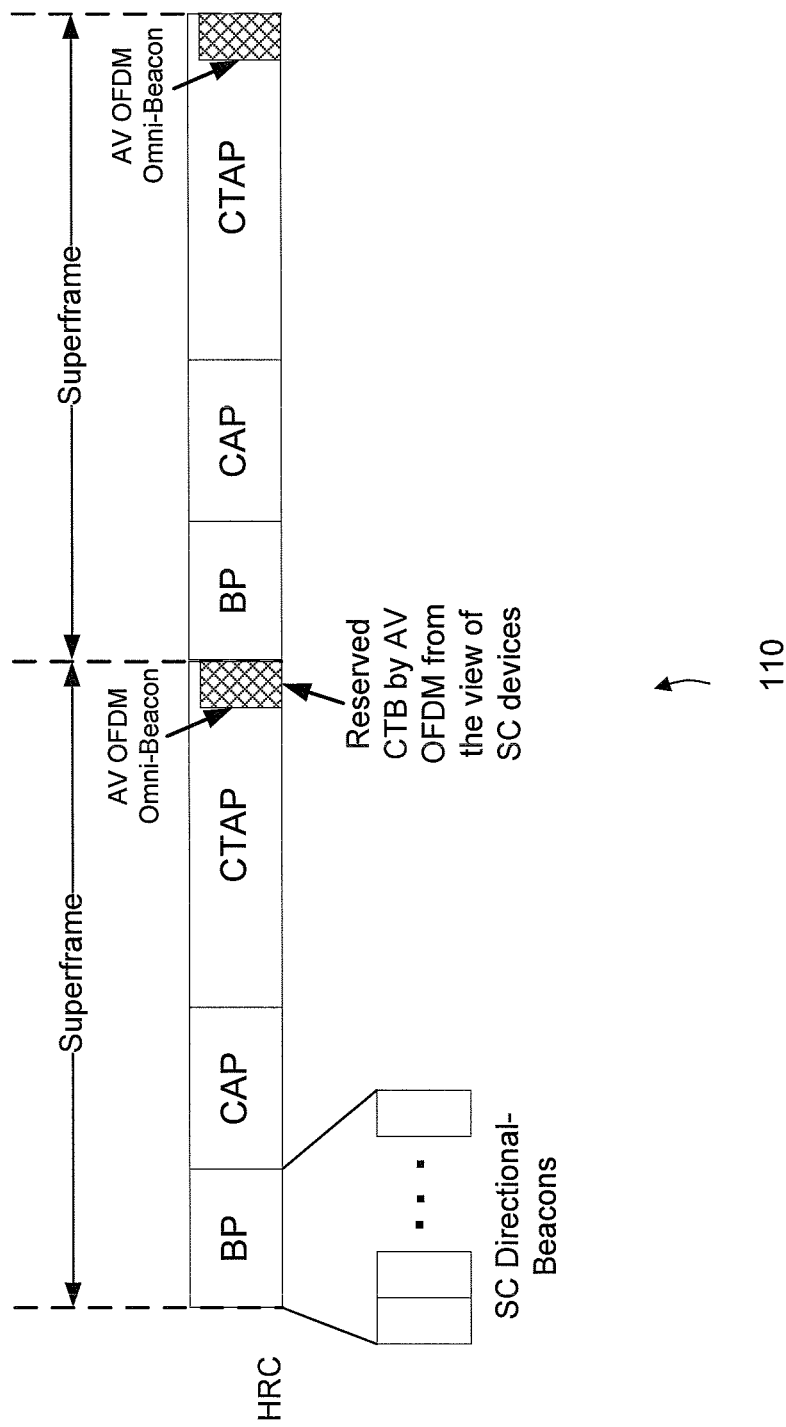

An embodiment of the invention for supporting coexistence at the same 60 GHz channel between single carrier (SC) devices defined in IEEE 802.15.3c and Audio/Video Orthogonal frequency division multiplexing (AV OFDM) devices defined in WirelessHD, is now described. As shown in by the example superframe structure for channel time allocations 90 in FIG. 9, one channel time block (CTB) at the end of each superframe of SC devices is used for AV OFDM beacon transmission. The SC and AV OFDM types of wireless devices have different superframe structures 100, 110 as shown in FIGS. 10 and 11 respectively, though they operate on the same channel. FIG. 10 shows a superframe structure 100 view for AV OFDM type wireless devices. FIG. 11 shows a superframe structure 110 view from SC type wireless devices.

Figure 12:
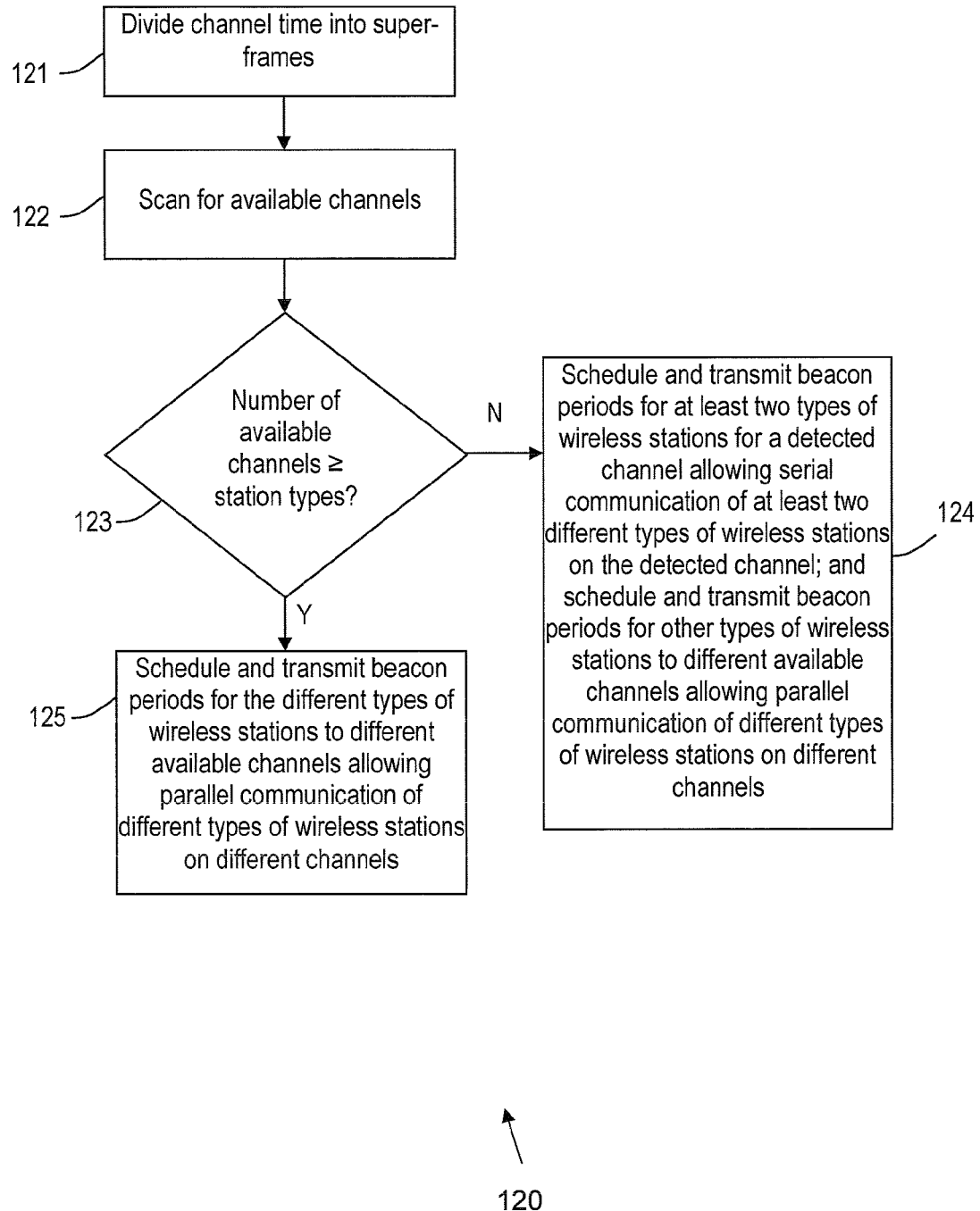
FIGS. 12 and 13 show flowcharts of processes for coordinating communication of different waveforms in the same frequency band by different wireless station types using a superframe structure, according to embodiments of the present invention.
Figure 13:
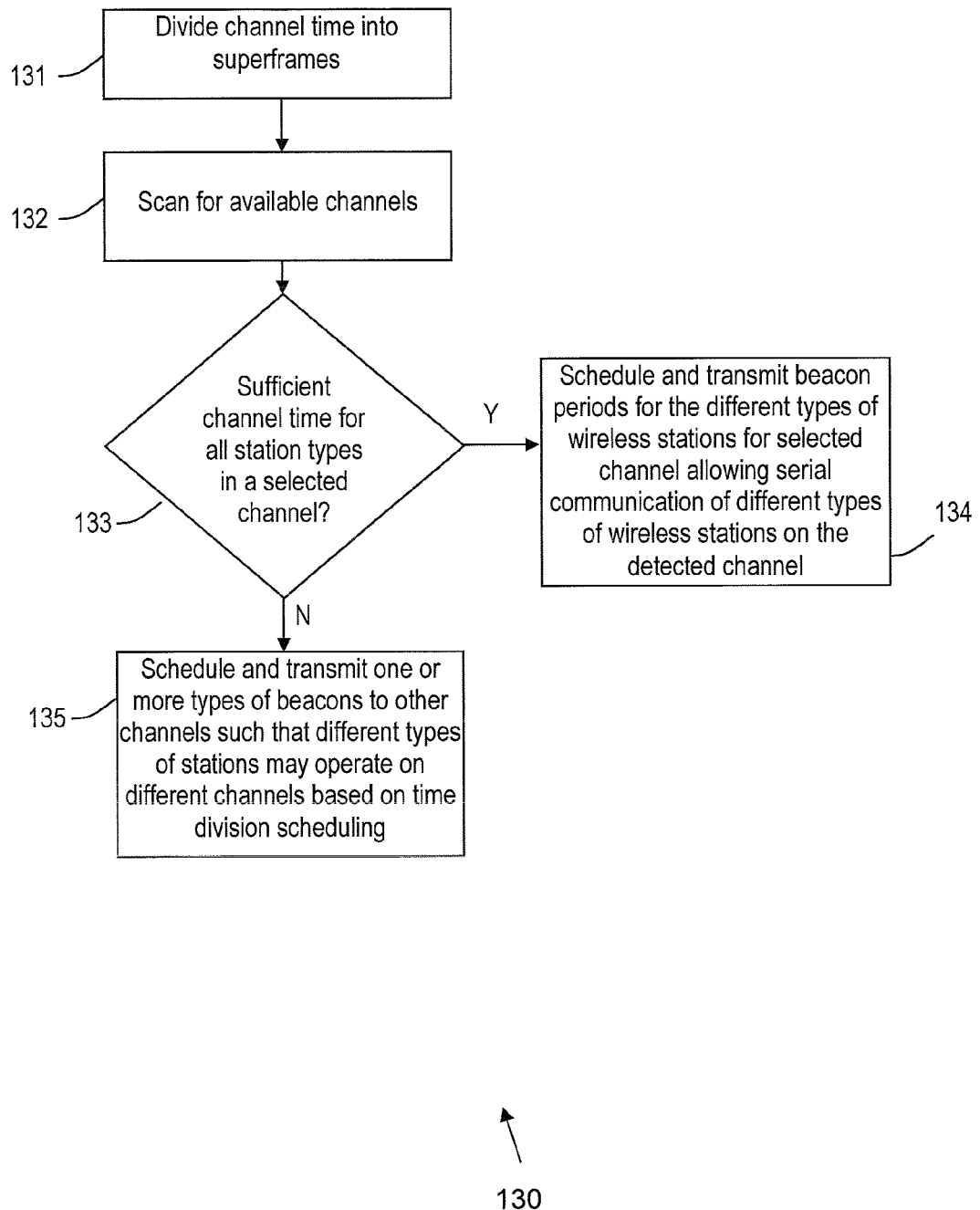

FIGS. 12 and 13 show flowcharts of said processes for coordinating communication of different waveforms in the same frequency band by different wireless station types using a superframe structure, according to embodiments of the present invention.

A coordination process 120 in FIG. 12, includes: dividing channel time into superframes (step 121), scanning for available channels (step 122), determining if number of available channels is same or greater than station types (step 123), if yes, then scheduling, and transmitting, beacon periods for the different types of wireless stations to different available channels allowing parallel communication of different types of wireless stations on different channels (step 124), otherwise scheduling, and transmitting, beacon periods for the some types of wireless stations for a detected channel allowing serial communication of different types of wireless stations on the detected channel, and scheduling, and transmitting, beacon periods other types of wireless stations on different available channels allowing parallel communication of different types of wireless stations on different channels (step 125).

Another coordination process 130 in FIG. 13, includes: dividing channel time into superframes (step 131), scanning for available channels (step 132), determining if there is sufficient channel time for all station types in a selected channel (step 133), if yes, then scheduling and transmitting beacon periods for the different types of wireless stations for selected channel allowing serial communication of different types of wireless stations on the detected channel (step 134), otherwise scheduling and transmitting one or more types of beacons to other channels such that different types of stations may operate on different channels based on time division scheduling (step 135).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. The present invention useful with various networks such as WLAN, WPAN and various wireless devices/stations such as wireless consumer electronics devices (e.g., wireless phones, PDAs, television sets), wireless appliances, and the like.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of providing coordination for managing communication of information over one or more wireless channels in a network including multiple wireless stations of different types operating at the same wireless frequency band but at different waveform formats, the method comprising:

allocating channel bandwidth by dividing channel time into one or more superframes, each superframe initiated by a beacon providing schedules for communication of packets of information over one or more channels, wherein each superframe having a structure based on wireless station type, wherein each superframe is bounded by beacons that are different based on station type, said allocating channel bandwidth further including:

scanning all available channels in the frequency band to detect available channels, wherein when the number of detected available channels is same or greater than the number of wireless station types, wherein different types of wireless stations operate at a same wireless frequency band but at different waveform formats; and then scheduling and transmitting beacon periods for the different types of wireless stations to different available channels, wherein each type of wireless station may have a dedicated available channel period for wireless communication in parallel with other types of wireless stations.

2. The method of claim 1 further comprising:
when the number of detected available channels is smaller than the station types, then for a detected channel, scheduling and transmitting beacon periods for different types of wireless stations for the detected channel, wherein multiple different beacon types for different waveform formats may be scheduled anywhere in each superframe such that one or more reserved channel time blocks and/or contention access periods for each station type may be scheduled in each superframe for serial wireless communication on the detected channel by different station types.

3. The method of claim 2 wherein for serial communication, scheduling beacon periods for different types of wireless stations in the same channel further includes scheduling one or more unreserved channel time blocks or contention access periods in each superframe.

4. The method of claim 2 wherein superframes bounded by beacons have different lengths based on different wireless station type.

5. The method of claim 2 further including:
a wireless station of one of said types scanning all channels to detect the beacons for that wireless station type; and
upon detecting a beacon of the type for that wireless station on a channel, the wireless station conducting an association process on that channel based on the detected beacon information.

6. The method of claim 1, wherein a common mode waveform is not required for communication of the different types of wireless stations.

7. The method of claim 1, wherein a beacon for one waveform format may be scheduled anywhere in a superframe of another waveform format.

8. The method of claim 1, wherein the structure of each superframe is variable.

9. The method of claim 1, wherein beacons and beacon periods may be located anywhere in a superframe.

10. The method of claim 9, wherein beacon periods comprise variable lengths.

11. The method of claim 9, wherein superframes may overlap based on beacon placement.

12. The method of claim 1, wherein each superframe comprises multiple beacons or beacon periods.

13. The method of claim 1, wherein channel bandwidth sharing is provided for the multiple wireless stations of different types operate at the same wireless frequency band but cannot directly communicate with each other due to the different waveform formats.

14. The method of claim 1, wherein different waveforms have different superframe structures.

15. A method of providing coordination for managing communication of information over one or more wireless channels in a network including multiple wireless stations of different types operating at the same wireless frequency band but at different waveform formats, the method comprising:
allocating channel bandwidth by dividing channel time into one or more superframes, each superframe initiated by a beacon providing schedules for communication of packets of information over one or more channels, wherein each superframe having a structure based on wireless station type, wherein each superframe is bounded by beacons that are different based on station type, said allocating channel bandwidth further including:
scanning all available channels in the frequency band to detect available channels, selecting a channel among the detected channels, when there is sufficient channel time in the selected channel for all the different station types, wherein different types of wireless stations operate at a same wireless frequency band but at different waveform formats; and
then scheduling and transmitting beacon periods for different types of wireless stations for the selected channel, wherein multiple different beacon types may be scheduled anywhere in each superframe such that one or more reserved channel time blocks for each station type may be scheduled in each superframe for serial wireless communication on the selected channel by different station types.

16. The method of claim 15 further comprising:
when there is insufficient channel time in the selected channel for all the different station types, then allocating channel bandwidth further includes scheduling and transmitting one or more types of beacons for different waveform formats to other channels such that different types of stations may operate on different channels based on time division scheduling.

17. The method of claim 16 wherein for serial communication, scheduling beacon periods for different types of wireless stations in the same channel further includes scheduling one or more unreserved channel time blocks or contention access periods in each superframe.

18. The method of claim 16 wherein superframes bounded by beacons have different lengths based on different wireless station type.

19. The method of claim 16 further including:
a wireless station of one of said types scanning all channels to detect the beacons for that wireless station type; and
upon detecting a beacon of the type for that wireless station on a channel, the wireless station conducting an association process on that channel based on the detected beacon information.

20. A wireless communication system for managing communication of information in a network including multiple wireless stations of different types operating at the same wireless frequency band but at different waveform formats, the system comprising:
a coordinator device that manages communication of information by said wireless stations over one or more wireless channels in the network,
including allocating channel bandwidth by dividing channel time into one or more superframes, each superframe initiated by a beacon providing schedules for communication of packets of information over one or more channels,
wherein each superframe having a structure based on wireless station type, wherein each superframe is bounded by beacons that are different based on station type,
the controller including a scheduler that scans all available channels in the frequency band to detected available channels,
wherein when the number of detected available channels is same or greater than the number of wireless station types, then the scheduler scheduling and transmitting beacon periods for the different types of wireless stations to different available channels,
wherein different types of wireless stations operate at a same wireless frequency band but at different waveform formats,
wherein each type of wireless station may have a dedicated available channel period for wireless communication in parallel with other types of wireless stations.

21. The system of claim 20 wherein when the number of detected available channels is smaller than the station types, then for a detected channel the scheduler schedules and transmits beacon periods for different types of wireless stations for the detected channel, wherein multiple different beacon types for different waveform formats may be scheduled anywhere in each superframe such that one or more reserved channel time blocks for each station type may be scheduled in each superframe for serial wireless communication on the detected channel by different station types.

22. The system of claim 21 wherein for serial communication, the scheduler schedules beacon periods for different types of wireless stations in the same channel further includes scheduling one or more unreserved channel time blocks or contention access periods in each superframe.

23. The system of claim 21 wherein superframes bounded by beacons have different lengths based on different wireless station type.

24. The system of claim 21 further including:
a wireless station of one of said types that scans all channels to detect the beacons for that wireless station type, and upon detecting a beacon of the type for that wireless station on a channel, the wireless station conducts an association process on that channel based on the detected beacon information.

25. The system of claim 21 wherein the coordinator includes a Media Access Control (MAC) layer and a physical (PHY), the MAC layer implementing the scheduler for communication via the PHY layer.

26. The system of claim 25, wherein a same PHY is used for communication of different waveforms in the same frequency band.

27. A wireless communication system for managing communication of information in a network including multiple wireless stations of different types operating at the same wireless frequency band but at different waveform formats, the system comprising:
a coordinator device configured for managing communication of information by said wireless stations over one or more wireless channels in the network, including allocating channel bandwidth by dividing channel time into one or more superframes, each superframe initiated by a beacon providing schedules for communication of packets of information over one or more channels,
wherein each superframe having a structure based on wireless station type, wherein each superframe is bounded by beacons that are different based on station type,
the controller including a scheduler that scans all available channels in a the frequency band to detect available channels, when there is sufficient channel time in the selected channel for all the different station types,
wherein different types of wireless stations operate at a same wireless frequency band but at different waveform for,
the scheduler further selects a channel among the detected channels, then schedules and transmits beacon periods for different types of wireless stations for the selected channel,
wherein multiple different beacon types may be scheduled anywhere in each superframe such that one or more reserved channel time blocks for each station type may be scheduled in each superframe for serial wireless communication on the selected channel by different station types.

28. The system of claim 27 wherein when there is insufficient channel time in the selected channel for all the different station types, the scheduler schedules and transmits one or more types of beacons to other channels such that different types of stations may operate on different channels based on time division scheduling, wherein different types of beacons have different waveform formats.

29. The system of claim 28 wherein for serial communication, the scheduler schedules and transmits beacon periods for different types of wireless stations in the same channel further including one or more unreserved channel time blocks or contention access periods in each superframe.

30. The system of claim 28 wherein superframes bounded by beacons have different lengths based on different station type.

31. The system of claim 28 further including:
a wireless station of one of said types scans all channels to detect the beacons for that wireless station type, and upon detecting a beacon of the type for that wireless station on a channel, the wireless station conducts an association process on that channel based on the detected beacon information.

* * * * *